Sept. 20, 1971          L. P. TAN          3,605,135
DRAIN FLUSHER
Filed Sept. 11, 1969
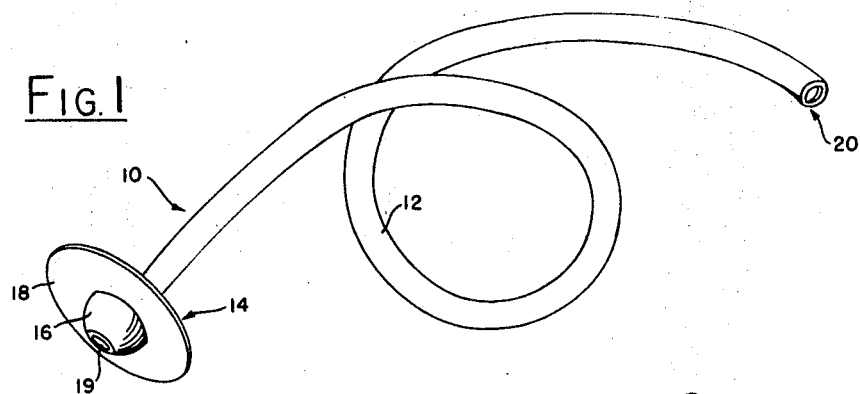
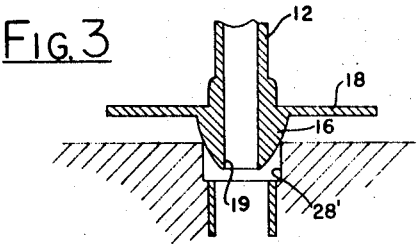
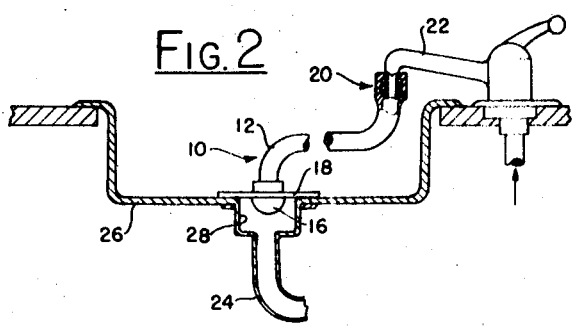
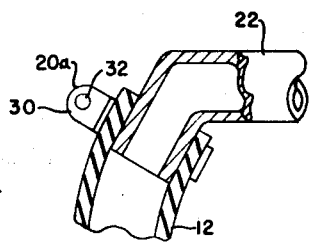
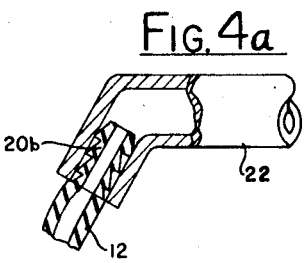
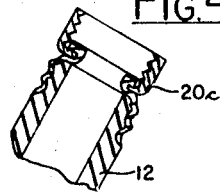
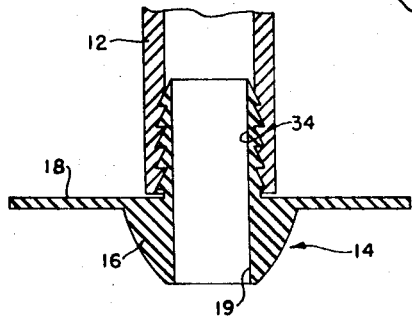
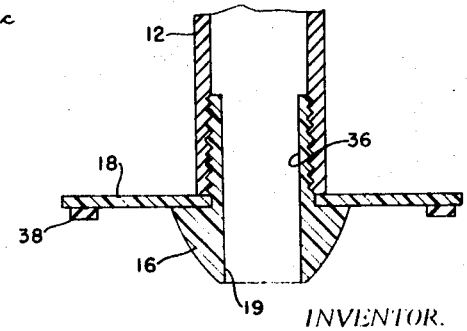
INVENTOR.
LOUIS P. TAN
BY
*Bean & Bean*
ATTORNEYS United States Patent Office 3,605,135
Patented Sept. 20, 1971

3,605,135
DRAIN FLUSHER
Louis P. Tan, 57 Walnut St., Lackawanna, N.Y. 14218
Filed Sept. 11, 1969, Ser. No. 857,007
Int. Cl. E03d 3/00
U.S. Cl. 4—256
1 Claim

ABSTRACT OF THE DISCLOSURE

A device for unclogging drains by means of water under pressure including a flexible hose connectible at one end thereof to a source of water under pressure and terminating adjacent another end thereof in a tapered seat bounded by a radially extending flange. The tapered seat and flange are alternatively adapted to be employed to provide a fluid seal for relatively narrow and relatively wide drain openings, respectively; the flange in either case providing a convenient surface against which a user may place his hand in bearing engagement for the purpose of maintaining the device in fluid sealing engagement with respect to the drain opening.

SUMMARY

The present invention generally relates to devices adapted for use in unclogging sink, basin or the like drains, and more particularly to a device employing water under pressure taken from a house supply spigot or other convenient source to flush a drain free of material collected therein.

It is an object of the present invention to provide a drain flushing device, which is of simple, inexpensive construction and may be quickly and efficiently placed in operation by an unskilled person.

In accordance with the present invention there is provided a flexible hose, which is connectible adjacent one end to a house supply spigot and terminates adjacent the other end thereof in a sealing device adapted to provide a fluid seal with respect to the opening of a drain to be flushed with water. The sealing device includes a tapered seat, which is bounded by a radially extending annular flange. The flange is employed for the purpose of providing a fluid seal when the drain opening is relatively large, as would be the case with most kitchen sinks, whereas the tapered seat is employed to provide a fluid seal about variously sized relatively narrow drain openings, such as would normally be provided with basement utility tubs. Further, the flange provides a convenient surface against which a user may place his hand in bearing engagement for the purpose of maintaining either the flange or seat in fluid sealing relationship with respect to the drain opening in order to prevent backing up of water when the spigot is turned on. Also, when the flange is employed to seal about large drain openings, the tapered seat serves to both guide the flange into association with the drain opening and thereafter maintain the flange in a centered relationship relative thereto.

DRAWINGS

The various features and advantages of the present invention will become more fully apparent from the following detailed description with reference being made to the accompanying drawings, in which:

FIG. 1 is a perspective view of the drain flushing device of the present invention;

FIG. 2 is a vertical sectional view illustrating the device in use with a conventional sink having a relatively large diameter drain opening;

FIG. 3 is a fragmentary vertical sectional view illustrating the device in use with a tub or the like having a relatively small diameter drain opening;

FIGS. 4–4b are fragmentary views illustrating alternative arrangements for connecting the device to a source of water under pressure; and FIGS. 5–5a are fragmentary views illustrating alternative flange-tapered seat constructions.

BACKGROUND OF THE INVENTION

Now referring particularly to FIGS. 1 and 2, it will be seen that in accordance with the preferred embodiment of the present invention, drain flushing device 10 includes a flexible tube 12 terminating adjacent one end thereof in a universal drain opening sealing device 14 comprising a tapered seat member 16 bounded by a radially extending, annular flange 18. While tapered seat member 16 is illustrated as being of spherical contour, it will be understood that the invention is not limited thereto. Thus, the term "tapered" is used generically to define any seat member of circular cross-sectional design whose cross-sectional area is gradually reduced towards member outlet opening 19.

The other end of tube 12 may be formed with a conventional fluid coupling or fitting 20 of the type having annular, tapered ribs, which are deformable, so as to provide a fluid seal with respect to a house water spigot or faucet 22, when the latter is inserted thereinto, as indicated in FIG. 2. Device 10 as thus far described, may be integrally formed of rubber or a suitable resiliently deformable plastic material, as desired.

It will be apparent from viewing FIG. 2, that device 10 has utility as a conduit through which water under conventional house pressure may be applied to the drain 24 of a sink, tub or the like 26 for the purpose of loosening and consequently washing away waste material lodged within the drain. To this end, flange 18 is dimensioned such that it may provide a fluid seal about a relatively large diameter drain opening 28 of the type conventionally provided with kitchen sinks, as indicated in FIG. 2, whereas tapered seat 16 is dimensioned such that it may form a fluid seal about a relatively small diameter drain opening 28' of the type conventionally provided with basement utility tubs in the manner indicated in FIG. 3.

Flange 18, in addition to providing a seal for large drain openings, defines a convenient bearing surface against which a user may place his hand for the purpose of maintaining either the flange or tapered seat 16 in fluid sealing engagement with respect to drain openings 28, 28'. Further, seat 16 additionally serves to guidingly position and maintain flange 18 centered relative to large diameter drain openings 28.

This is a particularly desirable feature, since otherwise it would be difficult to maintain flange 18 in sealing alignment with drain opening 28, due to the tendency of the former to slide or move on the film of water normally disposed between the flange and the surface of sink 26, which bounds the drain opening.

The operation of flushing device 10, as thus far described, is extremely simple, since all that is required is the three step operation of fluid connecting tube 12 to spigot 22; inserting tapered seat 16 into drain openings 28 or 28'; and turning on spigot 22, while maintaining sufficient hand pressure on flange 18 to resiliently deform seat 16 or flange 18 into fluid sealing engagement about openings 28 or 28'.

FIGS. 4–4b illustrate several suitable arrangements for connecting tube 12 to a source of water under pressure, which may be employed in place of fitting 20.

In FIG. 4, tube 12 is shown as being dimensioned to receive spigot 22 and as being secured thereto by a conventional fitting or hose clamp 20a, including a generally U-shaped metal collar 30 whose ends are clamped together by a screw device 32. Collar 30 may be removable from tube 12 or fixed thereto, as by means of adhesive, as desired.

In FIG. 4a, fitting 20b is shown as including integrally formed, annular, tapered ribs, which are deformable so as to provide a fluid seal when the fitting is inserted into spigot 22.

In FIG. 4b, fitting 20c is shown as being in the form of a threaded hose conection of the type conventionally provided at an end of a garden hose. This type of fitting has particular utility with basement tubs, which are ofttimes provided with spigots having threaded ends, or where the drain to be unclogged is a floor drain or the like and it is necessary to employ a hose extension to connect the flushing device to a relatively remote spigot.

An alternative construction is illustrated in FIG. 5, wherein sealing device 14 and hose 12 are formed separately and subsequently joined by screw threaded extension 34 provided on sealing device 14. Alternatively, sealing device 14 and hose 12 may be fixed together by means of adhesive or heat bonding.

In FIG. 5a, a further modified form of the present invention is shown, wherein each of hose 12, seat 16 and flange 18 are of separate construction. Flange 18 is clampingly secured between hose 12 and the seat 16 by operation of a screw threaded extension 36, which is formed as part of the seat.

FIG. 5a also illustrates a further possible modification of the present invention, wherein flange 18 is formed of a relatively rigid material so as to provide a nondeformable bearing surface for engagement by the hand of a user. In such an arrangement, a resiliently deformable ring member 38 is preferably fixed to the lower surface of the flange substantially concentrically of the seat by adhesive or heat bonding to provide a fluid seal about drain opening 28.

While several alternative embodiments of the drain flusher of the present invention have been described, various additional modifications thereof will likely occur to those skilled in the art. Exemplary thereof would be to flare the seat member into the flange, so as to permit the former to be effective in sealing about the full range of drain opening sizes.

Accordingly, I wish to be limited only by the scope of the appended claim.

What is claimed is:
1. A device for unclogging drains by means of water under pressure including in combination:
   a flexible tube;
   fitting means for securing one end of said tube in fluid communication with a source of water under pressure;
   a drain opening sealing device carried on the other end of said tube, said sealing device defining a relatively rigid non-deformable bearing surface portion and a resiliently deformable sealing surface portion, said bearing surface portion being engaeable by the hand of a user to maintain said sealing surface portion in fluid sealing engagement about the opening of a drain to be unclogged, whereby water under pressure may be passed by said tube from said source to said drain, said bearing surface portion being in the form of a separate disc having a central opening therein, a deformable seat coaxially disposed relative to said disc and projecting beyond said sealing surface portion, said seat including a shoulder, said disc being sandwiched between said shoulder and the other end of said tube, and means for coupling said other tube end to an oppositely projecting portion of said seat thereby retaining said disc in said sandwiched relationship.

References Cited
UNITED STATES PATENTS

| 1,351,368 | 8/1920  | Burns    | 4—256    |
| 1,647,804 | 11/1927 | Laney    | 4—256UX  |
| 2,027,661 | 1/1936  | Woodward | 4—256    |
| 2,048,852 | 7/1936  | Dumas    | 4—256UX  |
| 2,430,976 | 11/1947 | Dutra    | 4—256X   |
| 3,064,275 | 11/1962 | Allen    | 4—256    |

EDWARD L. ROBERTS, Primary Examiner

U.S. Cl. X.R.

15—104.05